(12) United States Patent
Yang

(10) Patent No.: US 6,693,502 B2
(45) Date of Patent: Feb. 17, 2004

(54) AIR CIRCUIT BREAKER

(75) Inventor: Ki Soo Yang, Daejeon (KR)

(73) Assignee: LG Industrial Systems Co., Ltd., Seoul (KR)

( * ) Notice: Subject to any disclaimer, the term of this patent is extended or adjusted under 35 U.S.C. 154(b) by 111 days.

(21) Appl. No.: 09/997,016

(22) Filed: Nov. 30, 2001

(65) Prior Publication Data

US 2002/0079995 A1 Jun. 27, 2002

(30) Foreign Application Priority Data

Dec. 1, 2000 (KR) .......................... 2000-72365

(51) Int. Cl.[7] .............................. H01H 9/00; H01H 9/20
(52) U.S. Cl. ...................................... 335/68; 200/50.01
(58) Field of Search ..................... 335/68–72; 200/50.1, 200/50.3, 50.5, 50.11

(56) References Cited

U.S. PATENT DOCUMENTS

| 3,632,917 | A | * | 1/1972 | Norden | ................. | 200/43.14 |
| 4,885,436 | A | * | 12/1989 | Pham et al. | ............. | 200/50.11 |
| 5,504,285 | A | * | 4/1996 | Castonguay et al. | ..... | 200/50.01 |
| 5,889,250 | A | * | 3/1999 | Castonguay | ................. | 218/154 |
| 5,929,405 | A | * | 7/1999 | Wehrli et al. | ............ | 200/50.01 |
| 6,400,245 | B1 | * | 6/2002 | Castonguay et al. | ........ | 335/202 |

* cited by examiner

Primary Examiner—Lincoln Donovan
Assistant Examiner—Bernard Rojas
(74) Attorney, Agent, or Firm—Birch, Stewart, Kolasch & Birch, LLP

(57) ABSTRACT

An air circuit breaker which includes an interlock apparatus which is capable of controlling translocation accurately by preventing deformation and the bending of a lead bar and by minimizing the tolerance in production by constructing the lead bar as two separated bodies and including a guide means for guiding the movement of the lead bar. The interlock apparatus is installed to a base frame for indicating the position of the breaker body, such as a disconnected position in which the breaker body is totally separated from the cradle, a tesing position for testing the breaker body and a connected position in which the breaker is connected to the cradle.

6 Claims, 6 Drawing Sheets

AIR CIRCUIT BREAKER

BACKGROUND OF THE INVENTION

1. Field of the Invention

The present invention relates to a draw out type air circuit breaker, and in particular to an interlock apparatus for indicating the position in a draw out type air circuit breaker which is capable of indicating accurately a disconnected position, a testing position and a connected position when a breaker is pushed in /pulled out from a cradle.

2. Description of the Prior Art

Generally, an air circuit breaker is installed between an electrical load and an electrical power source in order to protect the load equipment such as a motor and a converter, etc. and a line from an abnormal current (a short circuit, a ground fault, an excess current) generated in an electric circuit such as a power transmission/distribution line and private electricity generating facilities, etc., it means a breaker using air as a medium is for extinguishing an arc generated while opening/closing of contacts.

An air circuit breaker is divided into a fixed type fixedly installed between power source and a load and a drawer type in which a breaker is movable so as to be separated from power source and a load in order to facilitate maintenance and secure stability.

FIG. 1 is a side view illustrating a state in which a cradle is separated from a breaker body in a general draw out type air circuit breaker.

The general draw out type air circuit breaker includes a cradle 100 having an opened side and installed a power source connection terminal 60 connected to power source and a load connection terminal 62 connected to a electrical load equipment, a breaker body 200 movable so as to be pushed in or pulled out from the cradle 100 and performing a circuit cut-off operation in an abnormal current occurrence, and an interlock apparatus 300 for indicating a position of the breaker body 200 by being interlocked with a translocation of the breaker body 200 when the breaker body 200 is pushed in or pulled out from the cradle 100.

Herein, connectors 64, 66 are respectively connected to the power connection terminal 60 and the load connection terminal 62 of the cradle 100, the connectors 64, 66 are respectively inserted into a power source connection terminal 68 and a load connection terminal 70 projected from the breaker body 200 and are electrically connected.

And, the cradle 100 includes a guide rod 72 for guiding the translocation of the breaker body 200 when the breaker body 200 is pushed in/pulled out.

FIG. 2 is a side view illustrating an interlock apparatus of a drawer type air circuit breaker in accordance with the prior art, and FIG. 3 is a front view illustrating the interlock apparatus of FIG. 2 viewing from the right side.

The interlock apparatus in accordance with the prior art includes a base frame 102 fixed to the breaker body 200, shown in FIG. 1, a lead screw 104 supported by the base frame 102 so as to be rotatable, a screw pipe 106 fixed to the cradle 100 and be inserted by the lead screw 104, an interlock apparatus 300 installed on the base frame 102 and for indicating a position of the breaker body 200 when the lead screw 104 is meshed with the screw pipe 106, and a locking device 110 connected to the interlock apparatus 300 and locking a position when the breaker body 200 is placed at a disconnected position, a testing position and a connected position.

The interlock apparatus 300 includes a lead bar 112 disposed in parallel with the lead screw 104, contactable to one wall surface of the cradle 100 and retreating relatively when the lead screw 104 is meshed with the screw pipe 106 and linearly moves, a cam 114 connected to the lead bar 112 and installed in the base frame 102 so as to be rotatable for transforming a horizontal linear movement from the retreating lead bar 112 into rotating movement, and a indicating means 150 connected to the side of the cam 114 and for indicating a position of the breaker body 200 in accordance with the rotation of the cam 114.

The lead bar 112 is constructed in one body, one portion of the lead bar 112 is extended in parallel with the lead screw 104, the other portion of the lead bar 112 is constructed as a curved rod shaped member having a predetermined length so as to be inserted into a slot 118 provided in the cam 114.

And, a breakaway preventing member 120 for preventing a breakaway of the lead bar 112 from the slot 118 is installed to the end of the lead bar 112 inserted into the slot 118. And, a return spring 122 for providing an elastic force on the lead bar returning to an original position after operation is installed between the breakaway preventing member 120 and the base frame 102.

The cam 114 has a hinge portion 126 so as to be rotatably installed on the base frame 102, a slot 118 in which the lead bar 112 is inserted is formed at the lower portion of the cam 114 so as to be curved a certain times at a predetermined angle, and a connection pin 124 connected to an indicating plate 116 placed at the front of the hinge portion 126.

As depicted in FIGS. 2 and 3, the indicating means 150 includes the indicating plate 116 linearly moving up or down when the cam 114 rotates by being inserted by the connection pin 124 installed to the cam 114 and having a color indicating portion (not shown) on the upper front surface for indicating a position of the breaker body 200 with colors. A front plate 130 is fixedly installed to the base frame 102 at the front of the indicating plate 116 and having three indicating windows 138, 140, 142 for respectively indicating a position (a disconnected position, a test position, a connected position) of the color indicating portion of the indicate plate, a handle insertion hole 134 in which a handle (not shown) for rotating the lead screw 104 is inserted at the center portion. A guide plate 132 placed at the rear of the indicating plate 116 and for guiding the up or down movement of the indicating plate 116.

FIGS. 4 and 5 are state diagrams illustrating an operation state of a main parts of an interlock apparatus in accordance with the prior art.

In an interlock apparatus of a air circuit breaker in accordance with the prior art, in order to connect the cradle 100 to the breaker body 200, the breaker body 200 is placed on a guide rod 72 of the cradle 100 and is pushed in, accordingly the breaker body 200 is moved into the cradle 100. When the lead screw 104 contacts to the screw pipe 106 according to the moving of the breaker body 200 and a user rotates the lead screw 104 by using the handle, the lead screw proceeds into the screw pipe 106 while rotating.

Then, the two connection terminals 68, 70 projected from the breaker body 200 are connected to the two connectors 64, 66 installed to the cradle 100, accordingly the power source terminal 60 and the load terminal 62 are connected.

When the lead screw 104 proceeds, the lead bar 112 contacts to one wall surface of the cradle 100, herein the lead bar 112 moves in a direction opposite to the lead screw 104. As described above, when the lead bar 112 retreats, it rotates the cam 114 in the counter-clock wise while moving along the slot 118 of the cam 114, by the rotation of the cam 114 the indicate plate 116 moves up. Herein, the indicating portion 40 provided on the indicating plate 116 is displayed one of the three indicating windows 138, 140, 142 of the front plate 130 in order to indicate a present position of the breaker body 200.

In more detail, when the two connection terminals 68, 70 projected from the breaker body 200 and the connectors 64, 66 installed to the cradle 100 are not connected each other, the circuit is in the cut-off state, at the same time the lead screw 112 is totally separated from the screw pipe 106, the indicating portion 40 of the indicating plate 116 is displayed on the lowest indicating window 138 of the three indicating windows. Accordingly, the user recognizes the preset position as a disconnected position.

And, the lead screw 104 proceeds with a predetermined distance, the cradle 100 and the breaker body 200 are connected each other electrically and mechanically, when an electrical connection between the cradle 100 and the main electrical power source (high voltage power source supplied to the actual circuit between the power source and the load) is cut-off, control electrical power (low voltage power such as AC 110 volt for testing the breaker) is applied to the terminal 60, when the breaker body 200 reaches the testing position in which a user checks and tests each part of the breaker, the indicating plate 116 moves upwardly with a predetermined distance, the indicating portion 40 is displayed on the middle indicating window 140 of the three display windows, accordingly the user recognizes the breaker body 200 is at the testing position. When the lead screw 104 proceeds completely, the connection terminals 68, 70 are inserted into the connectors 64, 66 installed to the cradle 100 and reaches the connected position in which main electrical power source is supplied to the circuit between the power source and the load, the indicating portion 40 is displayed on the upper indicating window 142, accordingly the user recognizes the breaker body 200 is at the connected position.

However, in the interlock apparatus of the air circuit breaker in accordance with the prior art, the lead bar for rotating the cam is provided in one body as a rod having a predetermined length and there is no additional guide member for supporting and guiding the movement of the lead bar, so it is easy for the lead bar to be deformed or bent and a translocation of the indicating plate becomes inaccurate, accordingly it is impossible to indicate an accurate position of the breaker body.

In addition, there is a predetermined tolerance in order to facilitate the operation and the assembly of the lead bar, the tolerance is increased in accordance with the time passing, accordingly it is impossible to control a translocation accurately.

SUMMARY OF THE INVENTION

In order to achieve the above-mentioned problems, it is an object of the present invention to provide an air circuit breaker having an interlock apparatus which is capable of controlling a translocation accurately by preventing a deformation and a bent of a lead bar and minimizing a tolerance in production by constructing the lead bar as two separated bars and having a guide means guiding movement of the lead bar.

In order to achieve the above-mentioned object, in an air circuit breaker comprising a movable breaker body having a power source terminal and a load terminal and connecting or disconnecting a circuit between power source and a load;

a cradle electrically and mechanically connected to or separated from the breaker body in accordance with movement of the breaker body and having a connector electrically and mechanically connected to the breaker body, a screw pipe for guiding the connected to or separated from the breaker body and a power source terminal and a load terminal respectively connected to an electrical power source and an electrical load;

a base frame fixed to the breaker body;

a lead screw supported by the base frame so as to be rotatable and movable to a position for being inserted into the screw pipe and a position for being separated from the screw pipe;

a interlock apparatus installed on the base frame and for indicating a position of the breaker body such as a disconnected position in which the breaker body is totally separated from the cradle, a testing position for testing the breaker body and a connected position in which the breaker body is connected to the cradle;

the interlock device comprising;

a first lead bar extended from the base frame toward the front end of the lead screw in parallel with the lead screw and for generating a dynamic power for indicating a position of the breaker body by moving in a direction opposite to a forward direction of the lead screw when the lead screw is inserted into the screw pipe;

a guide member installed so as to be movable on the lead screw in the base frame, connected to the first lead bar and performing a horizontal linear movement corresponded to the movement of the first lead bar;

a second lead bar constructed separately from the first lead bar, connected to the guide member inside the base frame and performing a horizontal linear movement corresponded to the movement of the guide member;

a spring installed on the lead screw inside the base frame and for applying an elastic force on the first lead bar in a forward direction of the lead screw;

a cam connected to the second lead bar and for transforming the linear movement of the second lead bar into rotating movement; and an indicating means connected to the cam and for indicating a position of the breaker.

DETAILED DESCRIPTION OF THE PREFERRED EMBODIMENT

Figure 1:
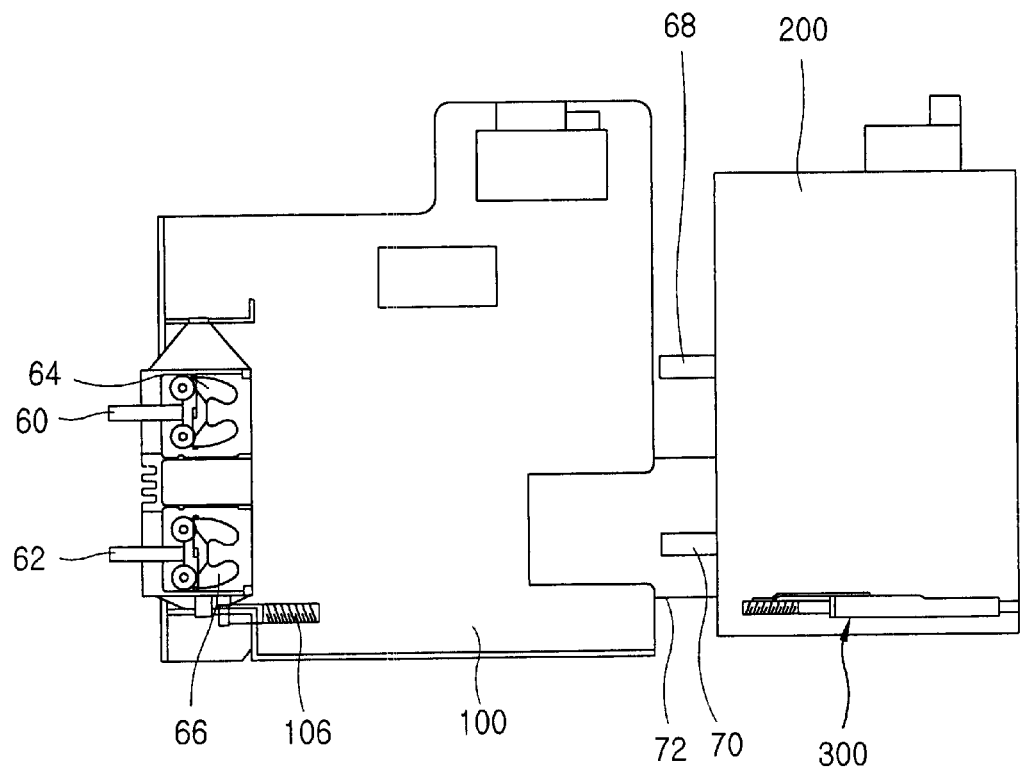
FIG. 1 is a side view illustrating a general air circuit breaker.
Figure 2:
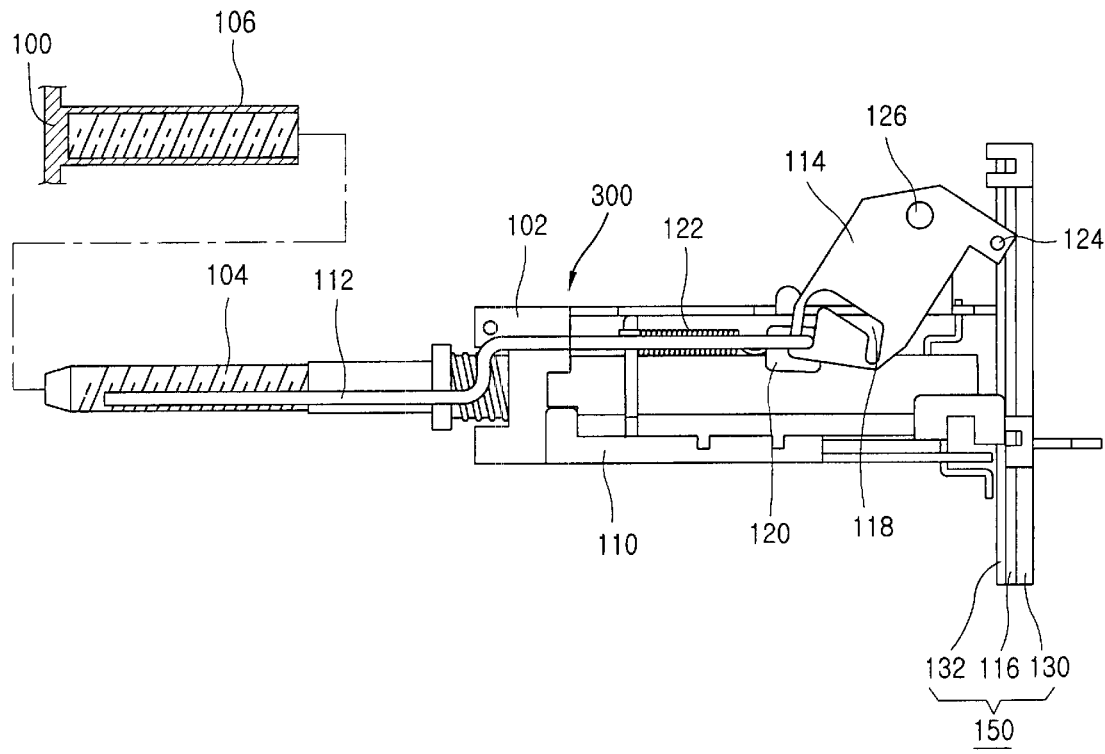
FIG. 2 is a side view illustrating an interlock apparatus of an air circuit breaker in accordance with the prior art.
Figure 3:
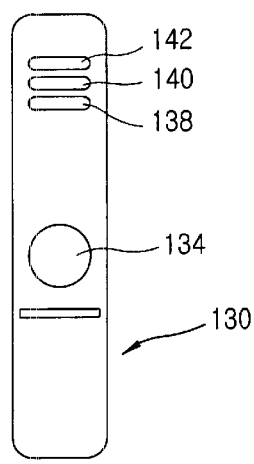
FIG. 3 is a front view illustrating the interlock apparatus of FIG. 2 viewing from the right side.
Figure 4:
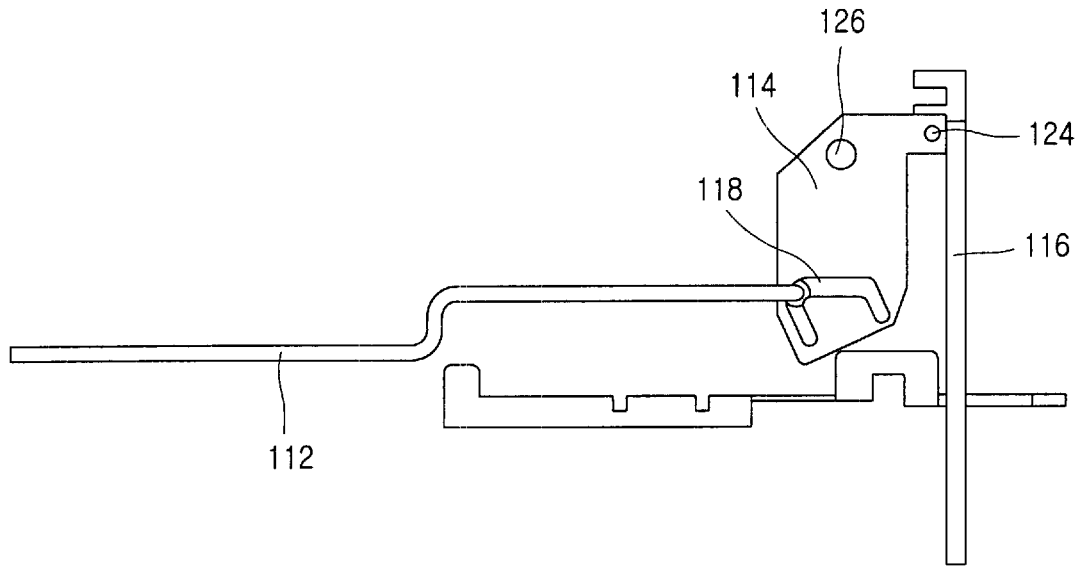
FIGS. 4 and 5 are state diagrams illustrating an operation state of a main parts of an interlock apparatus of the air circuit breaker in accordance with the prior art.
Figure 5:
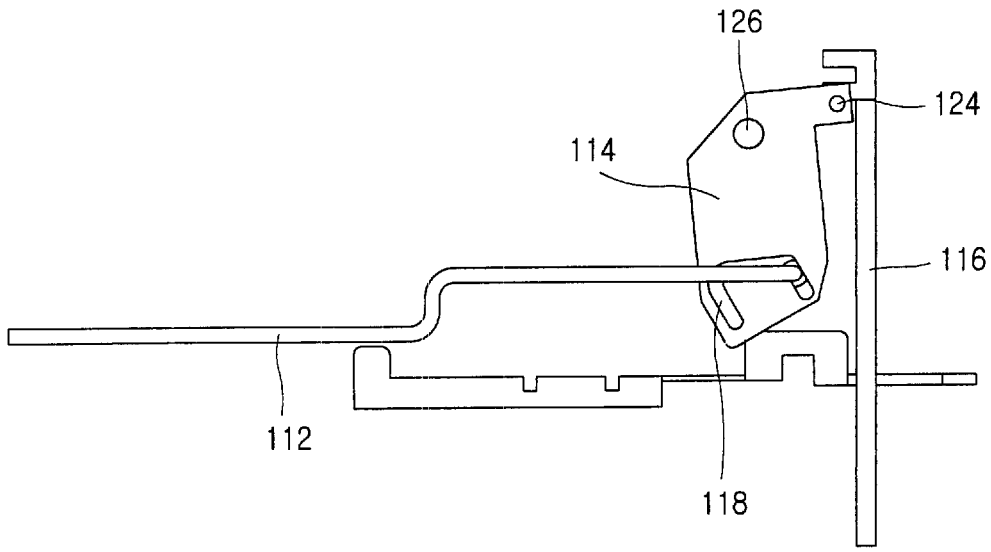

An embodiment of an air circuit breaker in accordance with the present invention will be described with reference to accompanying drawings.

There can be a plurality of embodiments of an interlock apparatus of an air circuit breaker in accordance with present invention, hereinafter the most preferred embodiment of the present invention will be described with reference to accompanying FIG. 6.

An air circuit breaker in accordance with the present invention includes a breaker body 200 having an electrical power source terminal and an electrical load terminal, movable, connecting or disconnecting a circuit between an electrical power source and an electrical load, a cradle 100 electrically and mechanically connected to or separated from the breaker body 200 in accordance with movement of the breaker body 200 and having connectors 64, 66 for electrically and mechanically connecting to the breaker body 200, a screw pipe 6 for guiding the connection to or the separation from the breaker body 200 and a power source terminal 60 and a load terminal 62 respectively connected to the electrical power source and the electrical load, a base frame 2 fixed to the breaker body, a lead screw 4 supported by the base frame 2 so as to be rotatable and movable to a position for being inserted into the screw pipe 6 and a position for being separated from the screw pipe 6, a interlock apparatus 300 installed to the base frame 2 and for indicating a position of the breaker body 200 such as a disconnected position in which the breaker body 200 is totally separated from the cradle 100, a testing position for testing the breaker body 200 and a connected position in which the breaker body 200 is connected to the cradle 100.

The a interlock apparatus 300 comprises a first lead bar 16 extended from the base frame 2 toward the front end of the lead screw 4 in parallel with the lead screw 4 and for generating a dynamic power in order to indicate a position of the breaker body 200 by moving in a direction opposite to a forward direction of the lead screw 4 when the lead screw 4 is inserted into the screw pipe 106, a guide member 18 installed so as to be movable on the lead screw 4 inside the base frame 100, connected to the first lead bar 16 and performing a horizontal linear movement corresponded to the movement of the first lead bar 16, a second lead bar 20 constructed separately from the first lead bar 16, connected to the guide member 18 inside the base frame 100 and performing a horizontal linear movement corresponded to the movement of the guide member 18, a spring 26 installed on the lead screw 4 inside the base frame 100 and for applying an elastic force in a forward direction of the lead screw 4, a cam 22 connected to the second lead bar 20 and rotating according to the linear movement of the second lead bar 20, and an indicating means 24 connected to the cam 22 and for indicating a position of the breaker body 200 while moving up or down by the rotation motion of the cam 22.

Figure 6:
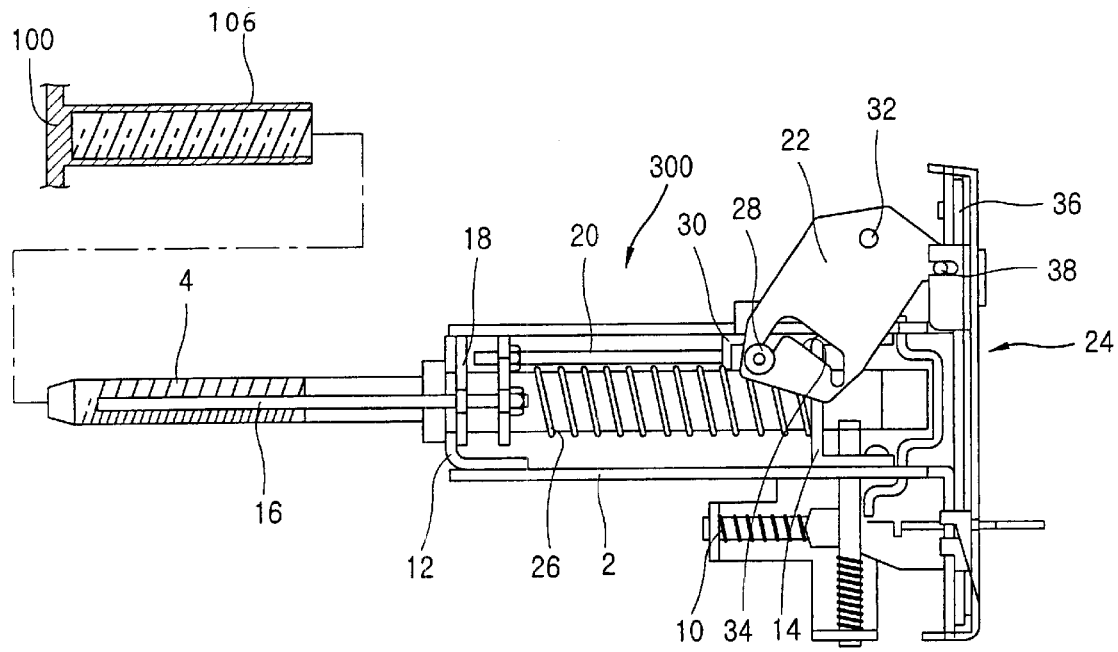
FIG. 6 is a side view illustrating an interlock apparatus of an air circuit breaker in accordance with the present invention.

As depicted in FIG. 6, the base frame 2 is constructed with two steel plates having a "L" shape and a "L" shaped front supporting panel 12 connecting the two steel plates with a predetermined distance each other, and two steel plates having a "L" shape are laid on and installed to the lower portion of the breaker body 200. A rear supporting panel 14 fixedly installed to the rear of the base frame 2 is further included in order to support the rear end portion of the lead screw 4.

Accordingly, the lead screw 4 is supported so as to be rotatable by the front supporting panel 12 and the rear supporting panel 14 of the base frame 2. A thread is provided on the outer circumference of the front end of the lead screw 4, the front end of the lead screw 4 is meshed with the screw pipe 6 having a thread on the inner circumference and fixed to the cradle 100. In more detail, in order to connect the breaker body 200 to the cradle 100, when the breaker body 200 is pushed in the cradle 100, a user rotates the lead screw 4 in the clock wise direction by using the handle, the threaded front end portion of the lead screw 4 is meshed with the threaded inner circumference of the screw pipe 6 on the cradle 100. When the user rotates the lead screw 4 in the counter-clockwise direction by using the handle for testing or disconnecting the breaker body 200, the threaded front end portion of the lead screw 4 is separated from the screw pipe 6 of the cradle 100. A locking device 10 is installed to the lower portion of the base frame 2 in order to lock the position of the breaker body 200 when the breaker body 200 is moved to the disconnected position or the testing position or the connected position. The position locking is performed by inserting a lock bolt into a groove formed at the rear end of the lead screw 4 by the elastic force of a spring (not having a reference numeral), and the position locking is released by pushing a slide bar projected from the lower portion of the indicating means 24 in by the user. For more detail construction and operation of the locking device 10, it can be referred to the Korean patent application No. 2000-2041 (filing date: Jan. 17th, 2000) filed by the assignee of the present invention about the detailed construction and the operation effect.

A groove (not shown) having a polygonal section is provided at the rear end of the lead screw 4 placed in the base frame 2 in order to insert the handle.

The first lead bar 16 is a bar-shaped member having a predetermined length extended from the base frame 2 toward the cradle 100 so as to be parallel with the front end of the lead screw 4. One end of the first lead bar 16 is free end, when the free end of the first lead bar 16 is inserted into the screw pipe, it is contacted to one wall surface of the cradle 100 and is pressed by the wall surface, accordingly the first lead bar 16 retreats in a direction opposite to the insertion direction (forward direction) of the lead screw 4. The other end of the first lead bar 16 is connected to the guide member 18.

Figure 7:
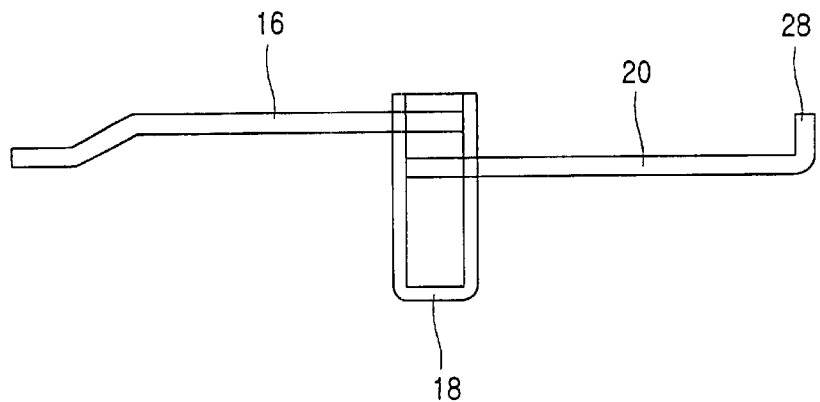
FIG. 7 is a side view illustrating a lead bar and a guide member of the interlock apparatus in accordance with the present invention.
Figure 8:
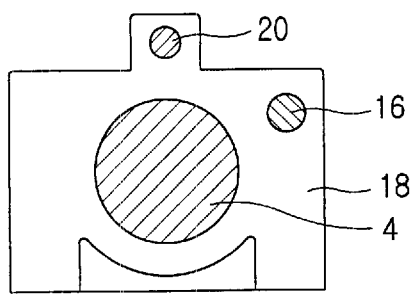
FIG. 8 is a front view illustrating a lead bar and a guide member of the interlock apparatus in accordance with the present invention

As depicted in FIGS. 7 and 8, The center of the guide member 18 is penetrated by the lead screw 4, the two steel plates performable the horizontal linear movement are connected each other on the outer circumference of the lead screw 4. In more detail, the guide member 18 penetrated by the lead screw 4 is installed on the outer circumference of the lead screw 4 in the base frame 2 so as to be performable the horizontal linear movement and is connected to the first lead bar 10 and the second lead bar 20 extended in the opposite direction each other viewing from the guide member 18. The guide member 18 transmits the dynamic power from the first lead bar 16 to the second lead bar 20 and guides the first lead bar 16 and the second lead bar 20 so as to perform the horizontal linear movement accurately.

The spring 26 is installed between the guide member 18 and the rear supporting panel 14, the spring 26 returns the first lead bar 16 to the original position by providing the elastic force on the first lead bar 16 via guide member 18 in the forward direction of the lead screw 4.

In the spring 26 constructed as a coil spring wound around the outer circumference of the lead screw 4, one end is supported by the surface of the guide member 18, and the other end is supported by the rear supporting panel 14.

The second lead bar 20 having a predetermined length is connected between the guide member 18 and the cam 22, when the guide member 18 is linearly moved, it is linearly moved together and rotates the cam 22. The end of the second lead bar 20 is connected to the guide member 18, and a guide pin 28 inserted into the slot 22 formed on the cam 22 and moving along the slot 22 is provided on the other end of the second lead bar 20.

A guide bracket 30 is installed in order to prevent a breakaway of the second lead bar 20 and transmit an accurate stroke to the cam 22 when the second lead bar 20 is linearly moved. In more detail, the guide bracket 30 is constructed as a plate member fixed to the lower plate of the base frame 2 and bent at a right angle, the guide bracket 30 includes a through hole penetrated by the second lead bar 20, accordingly the guide bracket 30 guides the linear movement of the second lead bar 20 by using the trough hole.

The cam 22 is installed on a hinge protrusion 32 projected from the one portion of the base frame 2 and rotates, having a predetermined shaped slot 34 provided at the lower portion of the cam 22 in order to be inserted by the movable guide pin 28 of the second lead bar 20, and having an operation protrusion 38 at the upper portion of the cam 22 connected to the indicate plate 36 of the indicating means 24 for moving the indicating plate 36 up or down.

When the guide pin 28 moves along the slot 34 by the linear movement of the second lead bar 20, the cam 22 rotates, according to it the operation protrusion 38 rotates together, accordingly the indicate plate 36 moves up or down.

Figure 9:
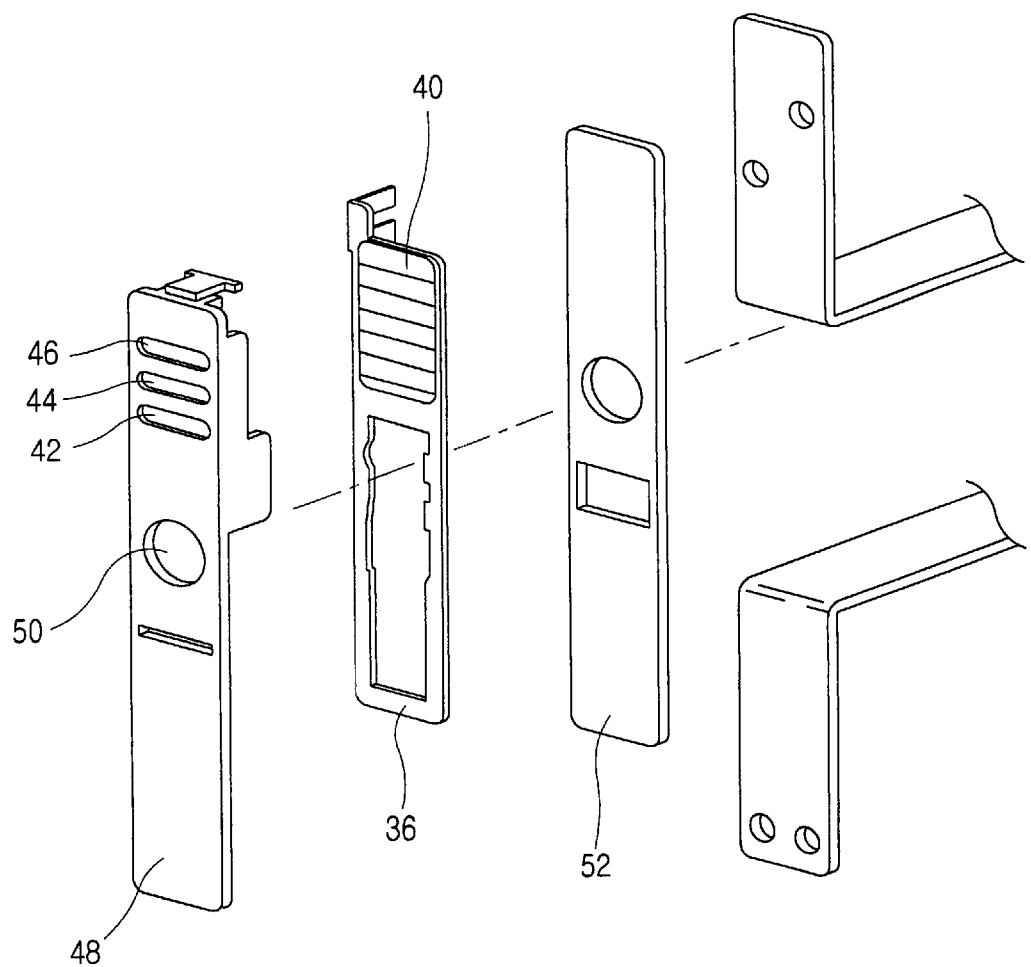
FIG. 9 is a perspective view illustrating an indicating means of the interlock apparatus in accordance with the present invention.

As depicted in FIG. 9, the indicating means 24 is for indicating a present position of the breaker body 200 to the user by linearly moving up or down while the rotation of the cam 22, it includes an indicating plate 36 linearly movable up or down and having an indicating portion 40 for indicating a position of the indicating plate 36 with colors, a front plate 48 placed at the front of the indicate plate 36, exposed on the front surface of the breaker body 200 and having three indicating windows 42, 44, 46 for seeing through the indicating portion 40, and a guide plate 52 placed at the rear of the indicate plate 36, fixed to the base frame 2 and for guiding the up or down movement of the indicating plate 36.

A front plate 48 has a flat plate, it includes a first indicating window 42 for displaying the indicating portion 40 when the breaker body 200 is at the disconnected position, a second indicating window 44 for displaying the indicating portion 40 when the breaker body 200 is at the testing position, and a third indicating window 46 for displaying the indicating portion 40 when the breaker body 200 is the connected position.

A reference numeral 50 is a handle insertion hole for inserting the handle.

The operation of the interlock apparatus of the air circuit breaker in accordance with the present invention will be described.

Figure 10:
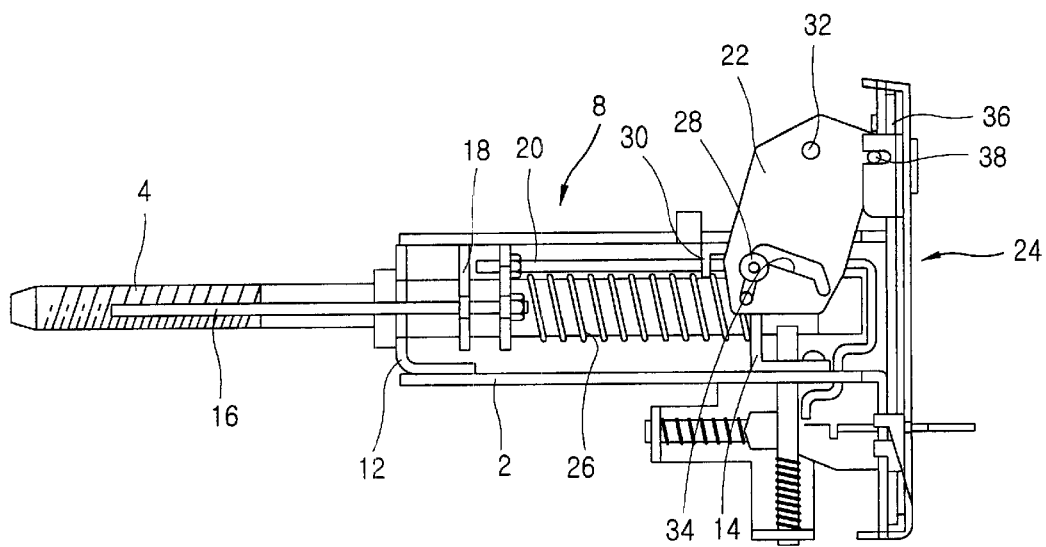
FIGS. 10 and 11 are state diagrams illustrating an operation state of the interlock apparatus of the air circuit breaker in accordance with the present invention.
Figure 11:
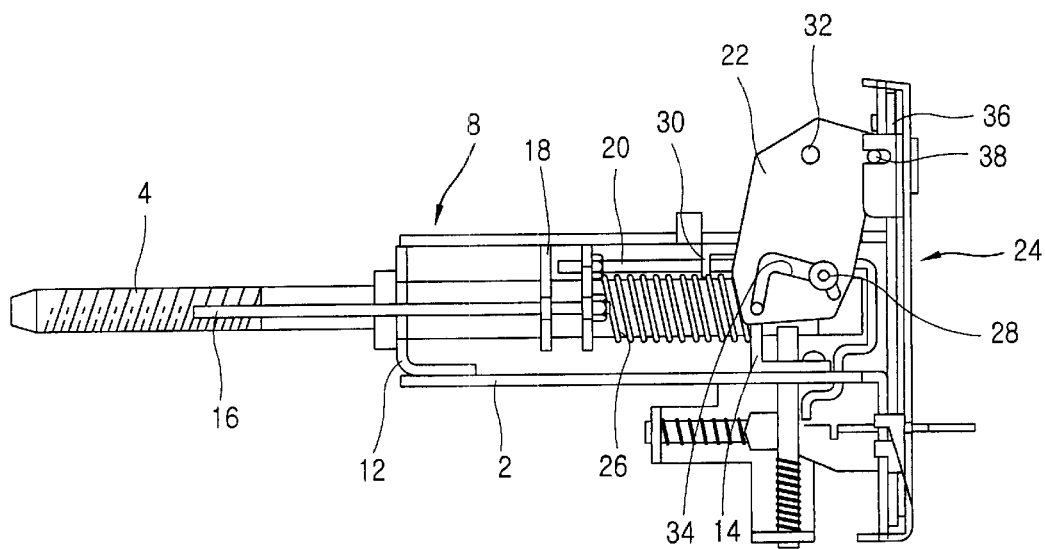

FIGS. 10 and 11 are state diagrams illustrating an operation state of the interlock apparatus of the air circuit breaker in accordance with the present invention. FIG. 10 illustrates the interlock apparatus when the breaker body is placed at the disconnected position, and FIG. 11 illustrates the interlock apparatus when the breaker body is connected to the cradle.

As depicted in FIG. 1, when the breaker body 200 is totally separated from the cradle 100, namely, at the disconnected position, there is no contact between the wall surface of the cradle 100 and the first lead bar 16. Then, as depicted in FIG. 9, the guide member 18 is pushed by the elastic force of the spring 26 and is adjacent to the front supporting plate 12 of the base frame 2, herein the first lead bar 16 proceeds in the insertion direction of the lead screw 4. When the first lead bar 16 proceeds, the cam 22 rotates in the clockwise direction, the guide pin 28 is placed at the left groove portion of the slot 34, at the same time the indicating plate 36 descends in the lowest position, the indicating portion 40 is displayed on the first indicating window 42, and the user recognizes the breaker body 200 is at the disconnected position. And, the interlock apparatus 8 is locked at the disconnected position by the locking device 10. As depicted in FIG. 1, at the testing position, the breaker body 200 is not totally separated from the cradle 100, the power source terminal 2 and the load terminal 4 of the cradle 100 and the connection terminals 10, 12 of the breaker body 200 are connected each other, and the lead screw 4 is pulled out not completely but a predetermined length from the screw pipe 6. At the testing position, the guide member 18 is placed at a middle position between a position depicted in FIG. 10 and a position depicted in FIG. 11, the guide pin 28 is placed at the middle portion of the slot 34, at the same time the indicating plate 36 ascends a predetermined distance, the color portion displaying the testing position of the indicating portion 40 is displayed on the second indicating window 44, and the user recognizes the present testing position. And, by the locking device 10, the interlock device 8 is locked at the testing position.

In the meantime, the operation to the connected position will be described in more detail.

The breaker body 200 is pushed into the cradle 100, the lead screw 4 is rotated in the clockwise direction by using the handle (not shown), the lead screw 4 rotates, at the same time proceeds and is inserted into the screw pipe 6. Herein, the first lead bar 16 is pressed by contacting to the wall surface of the cradle 100 and moves in a direction opposite to the insertion direction (the forward direction) of the lead screw 4. In more detail, the first lead bar 16 overcomes the elastic force of the spring 26 and retreats correspondingly with a stroke of the proceeding lead screw 4 as depicted in FIG. 10. When the first lead bar 16 retreats, the guide member 18 moves in a direction away from the front supporting plate 12 along the outer circumference of the lead screw 4, and the second lead bar 20 connected to the guide member 18 also retreats in the direction away from the front supporting plate 12. By the retreating of the second lead bar 20, the guide pin 28 goes back along the slot 34 formed at the cam 22, the cam 22 rotates in the counter clockwise direction by this retreating movement, and the indicating plate 36 moves upwards. Then, in the indicating portion 40 formed at the indicating plate 36, the color portion displaying the connected position moves upwards and is displayed on the third indicating window 46 formed at the front plate 48, accordingly the user recognizes the breaker body 200 is at the connected position. And, the interlock apparatus 8 is locked at the connected position by the locking device 10.

Herein, the guide member 18 moves along the outer circumference of the lead screw 4 and supports the first lead bar 16 so as to move linearly. And, the second lead air 20 is supported by the guide member 18 and the guide bracket 30 and linearly moves.

A described above, in the linear movement of the lead screw 4, in the process for transmitting the stroke of the first lead bar 16 to the indicating plate 36 in order to indicating the translocation of the breaker body 200 according to the movement stroke, the guide member 18 guides and supports the linear movement of the first lead bar 16 while moving along the outer circumference of the lead screw 4, the supported second lead bar 20 is linearly moved to the guide member 18 and the guide bracket 30, accordingly the accurate stroke is transmitted and the breakaway is prevented.

In an interlock apparatus of an air circuit breaker in accordance with the present invention, a lead bar positioned correspondingly to each position (a disconnected position, a testing position, a connected position) of a breaker body is separately constructed as a first lead bar and a second lead bar, a guide member is installed between the first lead bar and the second lead bar for rotating a cam according to the linear movement of the first lead bar, the second lead bar is supported and guided by the guide member and the guide bracket, it is possible to prevent a deformation or a bent of the lead bar due to force applied on the lead bar, a stroke according to a translocation of the breaker body can be accurately transmitted to the indicating plate, accordingly a user can accurately recognize a position of the breaker body.

What is claimed is:

1. In an air circuit breaker comprising;
   a movable breaker body having a power source terminal and a load terminal and connecting or disconnecting a circuit between an electrical power source and an electrical load;
   a cradle electrically and mechanically connected to or separated from the breaker body in accordance with movement of the breaker body and having a connector electrically and mechanically connected to the breaker body, a screw pipe for guiding the contact/separation to/from the breaker body and a power source terminal and a load terminal respectively connected to the electrical power source and the electrical load;
   a base frame fixed to the breaker body;
   a lead screw supported by the base frame so as to be rotatable and movable to a position for being inserted into the screw pipe and a position for being separated from the screw pipe;
   a interlock apparatus installed to the base frame and for indicating a position of the breaker body such as a disconnected position in which the breaker body is totally separated from the cradle, a testing position for testing the breaker body and a connected position in which the breaker body is connected to the cradle, the interlock device comprising;
   a first lead bar extended from the base frame toward the front end of the lead screw in parallel with the lead screw and generating a dynamic power for indicating a position of the breaker body by moving in a direction opposite to a forward direction of the lead screw when the lead screw is inserted into the screw pipe;
   a guide member installed so as to be movable on the lead screw in the base frame, connected to the first lead bar and performing a horizontal linear movement corresponded to the movement of the first lead bar;
   a second lead bar constructed separately from the first lead bar, connected to the guide member in the base frame and performing a horizontal linear movement corresponded to the movement of the guide member;
   a spring installed on the lead screw in the base frame and for applying an elastic force on the first lead bar in a forward direction of the lead screw;
   a cam connected to the second lead bar and for transforming the linear movement of the second lead bar into rotating movement; and
   a indicating means connected to the cam and for indicating a position of the breaker body.

2. The air circuit breaker according to claim 1, wherein the first lead bar is a bar-shaped member having a predetermined length extended from the base frame toward the cradle so as to be parallel with the front end of the lead screw, when the end of the first lead bar as a free end is inserted into the screw pipe, the free end is contacted to the wall surface of the cradle so as to be pressed in a direction opposite to the insertion direction of the lead screw, and the other end of the first lead bar is connected to the guide member.

3. The air circuit breaker according to claim 1, wherein the center of the guide member is penetrated by the lead screw so as to be performable a horizontal linear movement on the outer circumference of the lead screw in the base frame and is connected to the first lead bar and the second lead bar extended in the opposite direction each other viewing from the guide member.

4. The air circuit breaker according to claim 1 or 3, wherein the center of the guide member is penetrated by the lead screw and is constructed with two flat plates connected each other on the outer circumference of the lead screw so as to be performable the horizontal linear movement.

5. The air circuit breaker according to claim 1, wherein the second lead bar connected between the guide member and the cam is a bar-shaped member having a predetermined length and rotates the cam by linearly moving together when the guide member linearly moves.

6. The air circuit breaker according to claim 1, further comprising a guide bracket installed on one position in the base plate in order to guide the horizontal linear movement of the second lead bar.

* * * * *